Patented Oct. 23, 1945

2,387,366

UNITED STATES PATENT OFFICE 2,387,366

PYROLYSIS OF PYRAN DERIVATIVES

Walter J. Toussaint, South Charleston, W. Va., assignor to Carbide and Carbon Chemicals Corporation, a corporation of New York No Drawing. Application January 30, 1942,
Serial No. 428,873

8 Claims. (Cl. 260—601)

The present invention relates to the pyrolysis of certain unsaturated derivatives of pyran; and more especially it concerns the production of valuable aldehydes and unsaturated hydrocarbons from the high-boiling oils containing unsaturated derivatives of pyran formed as by-products in certain commercial processes for the manufacture of crotonaldehyde.

The invention has special utility in connection with the controlled pyrolysis of the 2,6-dimethyldihydro-3-formylpyran present in such high-boiling oils, with the resultant production of acetaldehyde, vinyl crotonaldehyde, and piperylene (1,3-pentadiene).

In well-known methods for the dehydration of acetaldol, in the presence of an aqueous solution of a mineral acid such as sulfuric acid, a mixture of acetaldehyde, crotonaldehyde, water and by-products is obtained, from which mixture the acetaldehyde and crotonaldehyde may be separated by distillation in a well-known manner. In the column commonly employed for distilling this mixture, certain volatile oils or high-boiling by-products tend to accumulate and may be separated and withdrawn from the column. The main constituent of the oil has been identified as 2,6-dimethyl-5,6-dihydro-3-formylpyran. This compound distills at a temperature within the range between 84° and 87° C. under an absolute pressure of 18 mm. of mercury; and it has a specific gravity at 20°/20° C. of about 1.0114.

The present invention is based in important part upon the discovery that, by the controlled pyrolysis of the aforesaid pyran derivative, under either atmospheric or reduced pressure, it is possible to depolymerize the compound with the resultant production of valuable compounds, including acetaldehyde, vinyl crotonaldehyde and piperylene.

The reactions occurring during the pyrolysis of 2,6-dimethyl-5,6-dihydro-3-formylpyran apparently may be designated as follows:

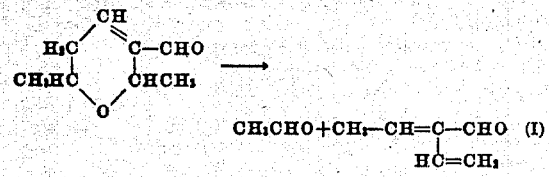

Vinyl crotonaldehyde is unstable under the thermal conditions of the pyrolysis and decomposes, yielding piperylene (1,3-pentadiene), apparently in accordance with the following equation:

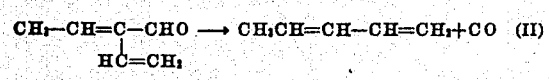

In accordance with a preferred form of the invention, vapors of the dimethyldihydro-3-formylpyran, or of a vaporous mixture containing the same, either alone or in admixture with an inert diluent, such as steam, nitrogen, methane or carbon monoxide, are passed through a reaction zone maintained at an elevated temperature within the range between around 400° C. and around 850° C. The gases produced in the pyrolysis, such as carbon monoxide, may be employed as inert diluents in the pyrolysis. The resultant reaction products are withdrawn from the reaction zone substantially as rapidly as formed, and are promptly condensed in suitable manner, as by water cooling, or by refrigeration, accompanied, if desired, by compression of the vapors. The condensate then may be fractionally distilled, and the acetaldehyde, vinyl crotonaldehyde and piperylene may be separately recovered. Acetaldehyde present in the piperylene fraction may be removed therefrom by extraction with water. Thus, the said condensate may be fractionated under atmospheric pressure to separate acetaldehyde and piperylene from the higher-boiling products. Further separation of the residue may be effected by distillation under vacuum, or in the presence of steam. When steam distillation is used, water may be added to the kettle products, and a reflux of water and reaction products returned to the column during the distillation. Under these conditions the vinyl crotonaldehyde boils at around 94.2° C. and is easily separated from the dimethyldihydro-3-formylpyran, which boils at 98°-99° C. under the said conditions.

It will be understood that the temperature at which the pyrolysis is conducted varies inversely with the time of exposure of the mixed vapors to the pyrolysis temperature. The higher temperatures within the range employed in the pyrolysis are employed advantageously when the pyrolysis is conducted under vacuum, or in conjunction with the use of a diluent such as steam. When the pyrolysis is conducted under atmospheric pressure, the minimum temperature for practical operation is around 400° C., while the maximum temperature does not greatly exceed around 600° C. When conducting the pyrolysis under vacuum, or in the presence of an inert diluent, temperatures within the range between around 500° C. and around 700° or 800° C. are preferred.

The following examples will serve to illustrate the invention:

EXAMPLE 1

2,6 - dimethyl - 5,6 - dihydro - 3 - formylpyran, which was secured by distillation of the oily by-products from a typical process for the production of crotonaldehyde from acetaldol, was pyrolyzed under the conditions set forth in Table I presented herebelow.

The vapors of the aforesaid substituted pyran were conducted through an electrically heated "Pyrex" tube having an internal diameter of 23 mm., and which tube was filled with glass beads over a length of 58.4 cm. The free volume in the heated section of the tube was 200 cc. The vaporous reaction products were withdrawn rapidly from the reaction zone and were cooled, condensed and collected in solid carbon dioxide-cooled traps. The condensate then was steam-distilled; and the acetaldehyde, vinyl crotonaldehyde and piperylene were separately recovered. Acetaldehyde present in the piperylene was recovered therefrom by extraction with water.

The various products present in the condensate from the pyrolysis may be separated and recovered by fractional distillation thereof under vacuum, or in the presence of an inert diluent such as steam, if desired.

Table I

|  | Example No. | | | | |
|---|---|---|---|---|---|
|  | 1 | 2 | 3 | 4 | 5 |
| Dimethyldihydroformylpyran, g | 142 | 198 | 325 | 351 | 48.8 |
| Water, g | | | | | 422 |
| Pressure, mm. of mercury | 760 | 760 | 100 | 13 | (Atm.) |
| Duration of run, hours | 2.8 | 1.1 | 5.5 | 3.25 | 1.33 |
| Total feed rate, g. per hr. | 53.4 | 183 | 59 | 101 | 36.7 |
| Temperature, °C | 525 | 430 | 525 | 600–620 | 594 |
| Dimethyldihydroformylpyran reacted, percent by weight | 94 | 49 | 78 | 82 | 74 |
| Overall yield, percent of theory, based on dimethyldihydroformylpyran: | | | | | |
| Acetaldehyde | 51.5 | 33 | 49 | 76 | 47 |
| Vinyl crotonaldehyde | 24 | 20 | 21 | 31 | 25 |
| Piperylene | 25 | 7 | 8 | 9 | 4 |

EXAMPLE 2

A quantity of dimethyldihydro-3-formylpyran was pyrolyzed in apparatus similar to that described in Example 1, under the conditions described in Table I. After the acetaldehyde had been distilled from the condensed products of the pyrolysis, the vinyl crotonaldehyde and piperylene were recovered from the residue by distillation under an absolute pressure of 18 mm. of mercury. The yields of piperylene and vinyl crotonaldehyde were lower than those secured in Example 1.

EXAMPLE 3

A quantity of dimethyldihydro-3-formylpyran was pyrolyzed in apparatus of the type described in Example 1, under the conditions indicated in Table I, employing an absolute pressure of 100 mm. of mercury. The reaction products were condensed, and the individual components then separated by fractional distillation under vacuum. Good yields of acetaldehyde and of vinyl crotonaldehyde were secured, together with a lesser yield of piperylene.

EXAMPLE 4

A quantity of dimethyldihydro-3-formylpyran was passed through an unpacked silica tube having an internal diameter of 30 mm., and heated for 71 cm. of its length in an electric furnace to a temperature ranging between 600° and 620° C., under the conditions recited in the foregoing Table I. The pyrolysis products were rapidly withdrawn and condensed, and the condenate fractionally distilled under vacuum, thereby providing good yields of acetaldehyde and vinyl crotonaldehyde, and a somewhat smaller yield of piperylene.

EXAMPLE 5

The same type of apparatus used in Example 4 was here employed, with the exception that means were provided for introducing steam with the vapors entering the pyrolysis zone; and no means were employed for creating a vacuum in the reaction zone. 48.8 grams of 2,6-dimethyl-5,6-dihydro-3-formylpyran and 422 grams of water were vaporized, and the mixture fed under atmospheric pressure through the pyrolysis zone of the silica tube maintained at around 594° C., at a combined feed rate of 36.7 grams per hour, as indicated in the foregoing Table I. The reaction products were condensed in suitable manner, the final condensation being conducted in solid carbon dioxide-cooled traps, and the condensate was fractionally distilled in the presence of steam, with separate recovery of the acetaldehyde, vinyl crotonaldehyde and piperylene constituents.

The process may be so conducted as to yield as the chief products vinyl crotonaldehyde and acetaldehyde; or to yield as the chief products acetaldehyde, in conjunction with piperylene. As indicated in Equations I and II hereinbefore recited, the first step in the pyrolysis of the dimer produces acetaldehyde and vinyl crotonaldehyde. The latter then decomposes to piperylene and carbon monoxide. Consequently a low conversion of the dimer favors the production of vinyl crotonaldehyde. A high conversion of the dimer favors the production of piperylene at the expense of the vinyl crotonaldehyde.

The vinyl crotonaldehyde produced in the pyrolysis reaction may be recycled, or it may be separated from the reaction mixture, and then pyrolyzed independently, under the conditions described herein for the pyrolysis of the dimethyldihydro-3-formylpyran. The resultant products then may be separated by steam distillation, or by dry fractional distillation, preferably under vacuum.

The invention is susceptible of modification within the scope of the appended claims.

I claim:

1. Process which comprises pyrolyzing a dimethyldihydro-3-formylpyran at a temperature within the range between around 400° C. and around 850° C., and condensing and recovering the resultant reaction products substantially as rapidly as formed.

2. Process which comprises pyrolyzing a dimethyldihydro-3-formylpyran at a temperature within the range between around 400° C. and around 850° C., and isolating from the resultant reaction mixture a compound thereby produced, selected from the class consisting of acetaldehyde, vinyl crotonaldehyde and piperylene.

3. Process which comprises pyrolyzing a dimethyldihydro-3-formylpyran at a temperature within the range between around 500° C. and around 850° C., in the presence of an inert diluent for the said pyran derivative, and condensing and recovering the resultant vaporous reaction products substantially as rapidly as formed.

4. Process which comprises pyrolyzing a dimethyldihydro-3-formylpyran at a temperature within the range between around 500° C. and around 850° C., in the presence of steam, and condensing and recovering the resultant vaporous reaction products substantially as rapidly as formed.

5. Process which comprises pyrolyzing a dimethyldihydro-3-formylpyran under subatmospheric pressure and at a temperature within the range between around 500° C. and around 700° C., and isolating from the resultant reaction mixture the acetaldehyde thus produced.

6. Process which comprises pyrolyzing a dimethyldihydro-3-formylpyran at a temperature within the range between around 400° C. and around 850° C., in the presence of an inert diluent for the said pyran derivative, removing the resultant reaction products substantially as rapidly as formed, and isolating from the latter at least one compound present therein selected from the class consisting of acetaldehyde, vinyl crotonaldehyde and piperylene.

7. Process which comprises pyrolyzing a dimethyldihydro-3-formylpyran at a temperature within the range between around 500° C. and around 700° C., in the presence of steam, removing the resultant reaction products substantially as rapidly as formed, and isolating from the latter the acetaldehyde present therein.

8. Process which comprises pyrolyzing an unsaturated aldehydopyran at a temperature within the range between around 400° C. and around 850° C., and condensing and recovering the resultant reaction products substantially as rapidly as formed.

WALTER J. TOUSSAINT.